United States Patent
Perkins

(10) Patent No.: US 8,924,120 B2
(45) Date of Patent: Dec. 30, 2014

(54) REGENERATIVE BRAKE CONTROL SYSTEM AND METHOD

(75) Inventor: William Paul Perkins, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1030 days.

(21) Appl. No.: 12/479,786

(22) Filed: Jun. 6, 2009

(65) Prior Publication Data

US 2010/0312447 A1 Dec. 9, 2010

(51) Int. Cl.
- *B60T 8/00* (2006.01)
- *B60T 8/175* (2006.01)
- *B60L 7/18* (2006.01)
- *B60W 30/18* (2012.01)
- *B60W 20/00* (2006.01)

(52) U.S. Cl.
CPC . *B60T 8/175* (2013.01); *B60L 7/18* (2013.01); *B60W 30/18127* (2013.01); *B60T 2270/603* (2013.01); *B60W 20/00* (2013.01); *B60W 2720/30* (2013.01)
USPC .......... 701/71; 701/36; 701/65; 701/69; 701/70; 701/78; 701/82; 701/83; 701/91; 303/138; 303/139; 303/151; 303/175; 303/189; 303/190

(58) Field of Classification Search
CPC ............ B60T 8/00; B60T 8/17; B60T 8/176; B60T 8/1761; B60T 8/1763; B60T 8/1766; B60T 8/1769
See application file for complete search history.

(56) References Cited

U.S. PATENT DOCUMENTS

| | | | | |
|---|---|---|---|---|
| 5,148,883 | A * | 9/1992 | Tanaka et al. | 180/165 |
| 5,358,317 | A * | 10/1994 | Cikanek | 303/152 |
| 5,476,310 | A * | 12/1995 | Ohtsu et al. | 303/3 |
| 5,492,192 | A * | 2/1996 | Brooks et al. | 180/165 |
| 5,508,924 | A * | 4/1996 | Yamashita | 701/22 |
| 5,511,859 | A * | 4/1996 | Kade et al. | 303/3 |
| 5,615,933 | A * | 4/1997 | Kidston et al. | 303/152 |
| 5,654,887 | A * | 8/1997 | Asa et al. | 701/22 |
| 5,853,229 | A | 12/1998 | Willmann et al. | |
| 6,033,041 | A * | 3/2000 | Koga et al. | 303/152 |
| 6,488,344 | B2 | 12/2002 | Huls et al. | |
| 7,001,306 | B2 | 2/2006 | Suzuki | |
| 7,122,979 | B2 | 10/2006 | Wilton et al. | |
| 7,198,335 | B2 | 4/2007 | Choi | |
| 7,925,411 | B2 * | 4/2011 | Fuhrer et al. | 701/81 |
| 8,061,464 | B2 * | 11/2011 | Boesch | 180/197 |
| 8,600,596 | B2 * | 12/2013 | Claeys et al. | 701/22 |
| 2002/0180266 | A1 * | 12/2002 | Hara et al. | 303/152 |
| 2003/0019674 | A1 | 1/2003 | Duan | |
| 2003/0062770 | A1 * | 4/2003 | Sasaki et al. | 303/152 |
| 2003/0173124 | A1 * | 9/2003 | Okada et al. | 180/65.2 |
| 2003/0184152 | A1 | 10/2003 | Cikanek et al. | |
| 2003/0230443 | A1 * | 12/2003 | Cramer et al. | 180/65.5 |
| 2004/0046448 | A1 * | 3/2004 | Brown | 303/152 |

(Continued)

Primary Examiner — Jonathan M Dager
(74) Attorney, Agent, or Firm — David Kelley, Esq.; Tung & Associates

(57) ABSTRACT

A regenerative brake control system for a vehicle includes a vehicle controller, a driveline torque distribution device interfacing with the vehicle controller, an electric machine interfacing with the driveline torque distribution device, a plurality of wheels coupled to the electric machine and at least one traction condition input indicating traction of the plurality of wheels provided to the vehicle controller. The vehicle controller engages the driveline torque distribution device and the electric machine apportions regenerative brake torque to the wheels in proportion to the traction of the wheels. A regenerative brake control method for a vehicle is also disclosed.

20 Claims, 4 Drawing Sheets

(56) References Cited

U.S. PATENT DOCUMENTS

| | | |
|---|---|---|
| 2005/0151420 A1 | 7/2005 | Crombez et al. |
| 2007/0018499 A1* | 1/2007 | Kokubo et al. ............... 303/151 |
| 2007/0273204 A1* | 11/2007 | Kodama et al. ............... 303/146 |
| 2008/0017428 A1 | 1/2008 | Masterson et al. |
| 2008/0061625 A1* | 3/2008 | Schmitt et al. ................ 303/146 |
| 2008/0228368 A1* | 9/2008 | Fuhrer et al. .................... 701/81 |
| 2009/0076696 A1* | 3/2009 | Perkins et al. ................... 701/69 |
| 2010/0025131 A1* | 2/2010 | Gloceri et al. ............. 180/65.28 |

* cited by examiner

US 8,924,120 B2

REGENERATIVE BRAKE CONTROL SYSTEM AND METHOD

TECHNICAL FIELD

The present disclosure relates to systems and methods for recovering regenerative power in vehicles. More particularly, the present disclosure relates to a regenerative brake control system and method for four-wheel drive vehicles which optimizes apportionment of regenerative brake torque to all four wheels of a vehicle while maintaining vehicle stability.

BACKGROUND

To improve fuel economy, hybrid electric vehicles (HEVs) may provide regenerative (regen) braking, in which kinetic energy is converted by an electric machine into storable energy during braking and then made available for propulsion. In many HEVs, the regen components collect energy from one axle only such that when braking is required, the regen energy is collected first up to the regen or traction/stability limit, followed by application of friction brakes at the other axle or both axles to slow or stop the vehicle. During regenerative braking, collection of regen energy from one axle only may not balance brake torque between the front and rear wheels in proportion to available traction at each wheel, which could affect vehicle stability.

Therefore, a regenerative brake control system and method for four-wheel drive vehicles which optimizes apportionment of regenerative brake torque to all four wheels of a vehicle while maintaining vehicle stability is needed.

SUMMARY

The present disclosure is generally directed to a regenerative brake control system for a vehicle. An illustrative embodiment of the regenerative brake control system includes a vehicle controller, a driveline torque distribution device, such as a variable coupler, interfacing with the vehicle controller, an electric machine interfacing with the driveline torque distribution device, a plurality of wheels coupled to the electric machine and at least one traction condition input indicating traction of the plurality of wheels provided to the vehicle controller. The vehicle controller engages the driveline torque distribution device and the electric machine apportions regenerative brake torque to the wheels in proportion to the traction of the wheels.

The present disclosure is further generally directed to a regenerative brake control method for a vehicle. An illustrative embodiment of the method includes providing a vehicle having four wheels; calculating traction coefficients for the wheels, respectively; determining an optimal regeneration brake torque apportionment among the wheels based on the traction coefficients; and apportioning the optimal regeneration brake torque to the wheels in proportion to the traction coefficients.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. Furthermore, there is no intention to be bound by any expressed or implied theory presented in the preceding technical field, background, brief summary or the following detailed description.

Figure 1:
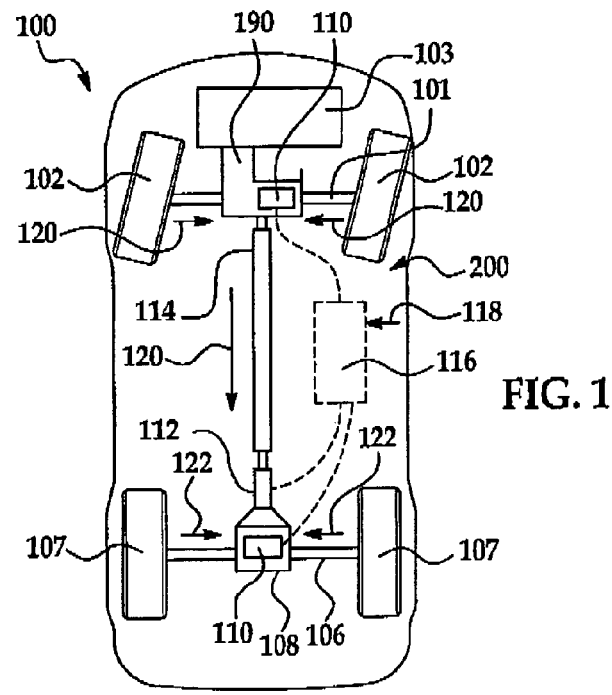
FIG. 1 is a schematic diagram of a vehicle fitted with an illustrative embodiment of the regenerative brake control system.
Figure 4:
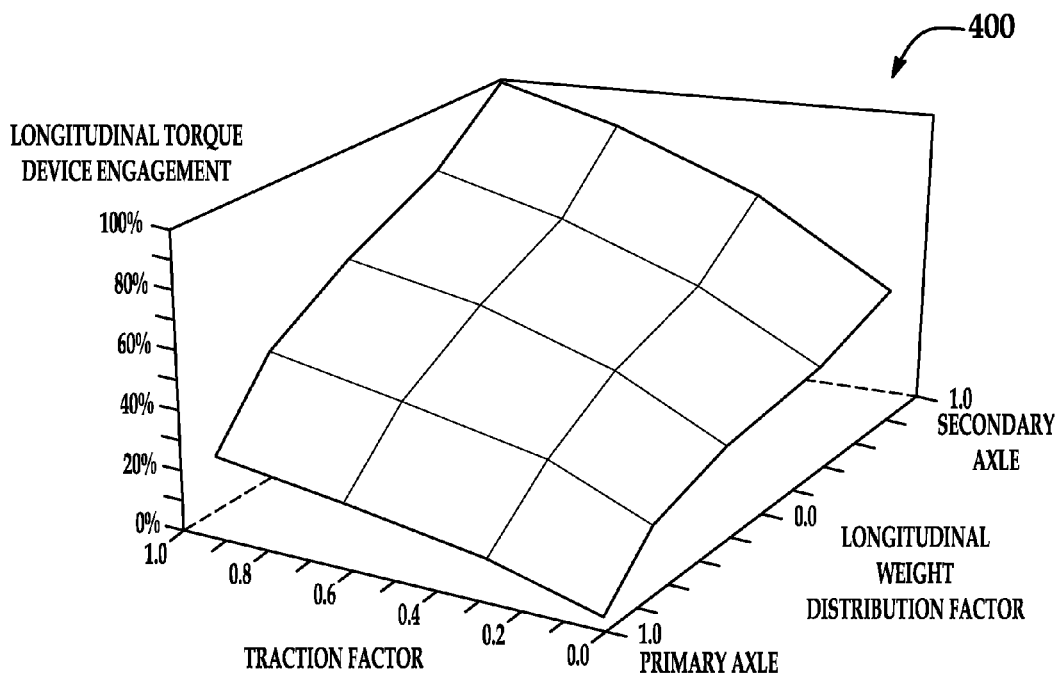
FIG. 4 is an illustrative 3-dimensional lookup table for longitudinal torque distribution device control of a driveline torque distribution device in implementation of an illustrative embodiment of the regenerative brake control system and method.
Figure 5:
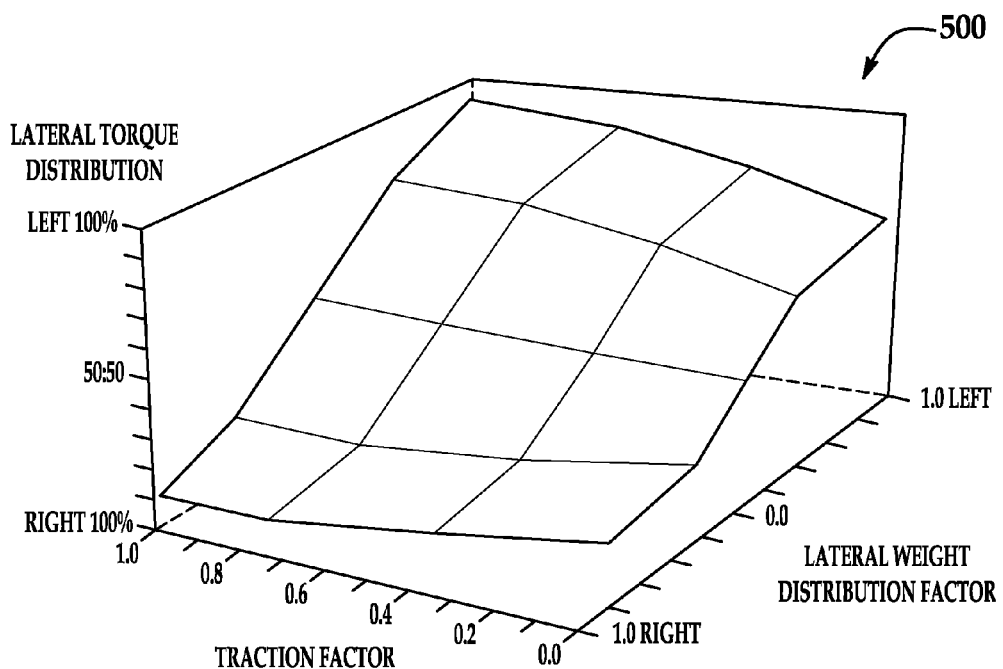
FIG. 5 is an illustrative 3-dimensional lookup table for lateral torque distribution device control of a driveline torque distribution device in implementation of an illustrative embodiment of the regenerative brake control system and method.

Referring initially to FIGS. 1, 4 and 5, an illustrative vehicle which is suitable for implementation of an illustrative embodiment of the regenerative brake control system and method is generally indicated by reference numeral 100 in FIG. 1. In some applications the vehicle 100 may be a four-wheel drive hybrid electric vehicle (HEV), for example and without limitation. The vehicle 100 includes a front axle 101 which mounts a pair of front wheels 102. An engine 103 drivingly engages the front wheels 102 through the transaxle 190 and front half-shafts 101. A rear axle 106 mounts a pair of rear wheels 107. An electric machine 108 engages the rear axle 106. A driveline longitudinal torque distribution device 112 is coupled to the electric machine 108. A drive shaft 114 couples the transaxle 190 to the longitudinal torque distribution device 112. A vehicle controller 116 communicates with the longitudinal torque distribution device 112.

In operation of the vehicle 100, the engine 103 may drive the front wheels 102 via the transaxle 190 and front axle 101. Under driving conditions in which the vehicle 100 is traveling on low-traction surfaces, the longitudinal torque distribution device 112, responsive to input from the vehicle controller 116, may improve propulsion of the vehicle 100 by additionally engaging the rear wheels 107 through coupling of the drive shaft 114 with the rear axle 106.

During deceleration of the vehicle 100, the vehicle controller 116 receives various inputs 118 such as, for example and without limitation, traction condition inputs which indicate and formulates traction coefficients that reflect the magnitude of traction which is available at each of the front axle 101 and the rear axle 106 and, in some applications, at each of the front wheels 102 and the rear wheels 107. The vehicle controller 116 may additionally receive vehicle dynamics inputs such as yaw, pitch and roll of the vehicle 100 and/or driver inputs such as braking and steering of the vehicle 100. The vehicle controller 116 uses these traction coefficients and inputs to determine the optimal regenerative brake torque apportionment which should be applied to the front wheels via the front axle 101 and to the rear wheels 107 via the rear axle 106, in proportion to the availability of traction at each of the front axle 101 and the rear axle 106. Based on this determination, the vehicle controller variably engages the longitudinal torque distribution device 112 in such a manner that the electric machine 108 balances the magnitude of front wheel regeneration torque 120 to the front axle 101 through the drive shaft 114 and the magnitude of rear wheel regeneration torque 122 to the rear axle 106 according to the traction availability at the front axle 101 and the rear axle 106. Therefore, the regenerative brake torque which is apportioned in a balanced manner to the front wheels 102 and the rear wheels 107 according to the traction available at the front axle 101 and the rear axle 106 may enhance capture of regenerative brake energy from the front axle 101 and the rear axle 106 while providing desired drive characteristics of the vehicle 100 such as stability, smooth transition between friction braking and regenerative braking and brake feel, for example and without limitation. The electric machine 108 generates regenerative brake energy which may be stored in a suitable onboard power source or storage device (not shown).

In some applications, active torque-vectoring control may be implemented by lateral torque distribution devices 110 in one or both of the front axle 101 and the rear axle 106 to further optimize distribution of regeneration torque between the front wheels 102 and/or the rear wheels 107. An exemplary lookup table 400 which may be used by the vehicle controller 116 to manage the longitudinal torque distribution device 110 is shown in FIG. 4. An exemplary lookup table 500 which may be used by the vehicle controller 116 to manage the lateral torque distribution device 110 is shown in FIG. 5.

The lookup table 400 in FIG. 4 indicates that the degree of engagement of the longitudinal torque distribution device 112 may be determined from calculations of weight distribution and traction. The longitudinal weight distribution factor may be calculated using accelerometers and other sensors such as suspension displacement sensors, for example and without limitation. It may also be modified for expected change in weight distribution using predictive algorithms based on steering, braking and GPS sensors, for example and without limitation. The longitudinal traction factor may be calculated using road sensors, wheel speed sensors, weather/road data and other parameters.

The lookup table in FIG. 5 indicates that the degree of left-right torque biasing may be determined from weight distribution and traction. The lateral weight distribution factor and the lateral traction factor may be calculated similar to the longitudinal weight distribution factor and the longitudinal traction factor described hereinabove.

Figure 2:
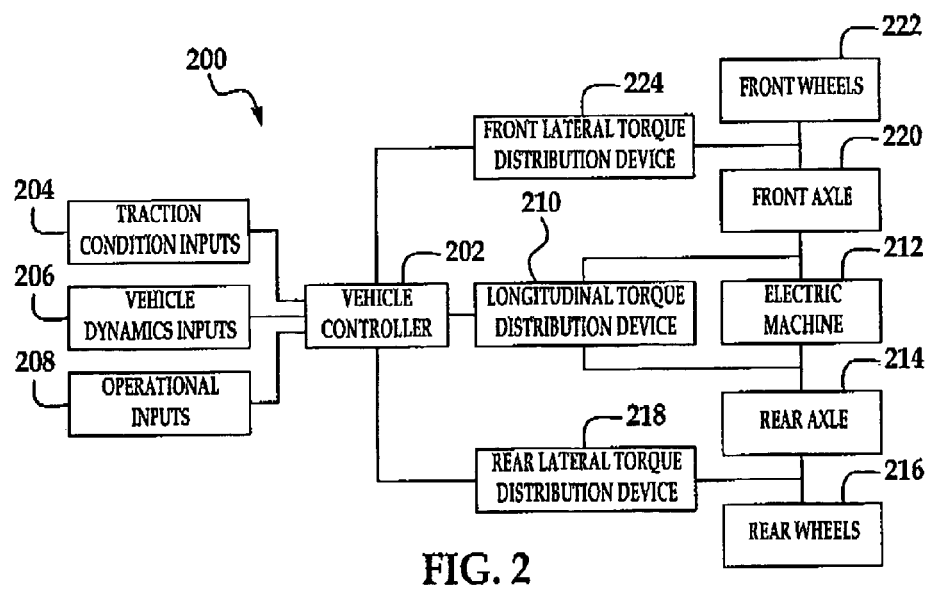
FIG. 2 is a general block diagram which illustrates an illustrative embodiment of the regenerative brake control system.

Referring next to FIG. 2, a general block diagram 200 which illustrates an illustrative embodiment of the regenerative brake control system is shown. The system 200 includes a vehicle controller 202 which may be a component of a vehicle (not shown) such as a hybrid electric vehicle (HEV), for example and without limitation. The vehicle controller 202 may be adapted to receive traction condition inputs 204, vehicle dynamics inputs 206 and operational inputs 208 from various sensors and components in the vehicle. The vehicle controller 202 interfaces with a driveline longitudinal torque distribution device 210 of the vehicle. The driveline longitudinal torque distribution device 210 interfaces with an electric machine 212 of the vehicle. The electric machine 212 is coupled to a front axle 220 having a pair of front wheels 222 and a rear axle 214 having a pair of rear wheels 216.

In typical operation of the system 200, the vehicle controller 202 receives the traction condition inputs 204, the vehicle dynamics inputs 206 and the operational inputs 208. The traction condition inputs 204 may include such inputs as rotational speed of the front wheels 222 and the rear wheels 216, precipitation detected by rain sensors, barometric pressure, ambient air temperature, road temperature and reflectivity, ambient humidity, visibility and/or broadcasted road and weather data, for example and without limitation. The vehicle dynamics inputs 206 may include various inputs received from accelerometers which indicate longitudinal, lateral, and vertical movement of the vehicle, the yaw, pitch and roll of the vehicle, and/or vehicle suspension displacement sensors. The operational inputs 208 may include such inputs as powertrain control data, driveline control data, brakes control data, suspension control data, steering control data and/or tire and vehicle constants, for example and without limitation.

Based on the traction conditions inputs 204, the vehicle controller 202 formulates probable traction coefficients for the front wheels 222 and the rear wheels 216. Using the traction coefficients, the vehicle dynamics inputs 206 and the operational inputs 208, the vehicle controller 202 determines the optimal regenerative brake torque which is to be apportioned among the front wheels 222 and the rear wheels 216 in proportion to the magnitude of traction available at the front axle 220 and the rear axle 214. The vehicle controller 202 then variably engages the driveline longitudinal torque distribution device 210, which apportions the regenerative brake torque to the front wheels 222 via the front axle 220 and to the rear wheels 216 via the rear axle 214 in proportion to the traction of the front wheels 222 and the rear wheels 216. The electric machine 212 converts the regenerative brake torque from the front axle 220 and the rear axle 214 into regenerative brake energy which may be transferred to a suitable onboard electric device or storage device (not shown). In some applications, an active front lateral torque distribution device 224 in the front axle 220 and/or an active rear lateral torque distribution device 218 in the rear axle 214 may further optimize distribution of regenerative torque between the front wheels 222 and/or the rear wheels 216. It will be appreciated by those skilled in the art that balanced apportionment of the regeneration torque to the front axle 220 and the rear axle 214 may maintain vehicle drive characteristics such as stability, dynamic weight shift, smooth transition between friction braking and regenerative brake and brake feel, for example and without limitation while maximizing capture of regenerative brake energy from the front axle 220 and the rear axle 214.

Figure 3:
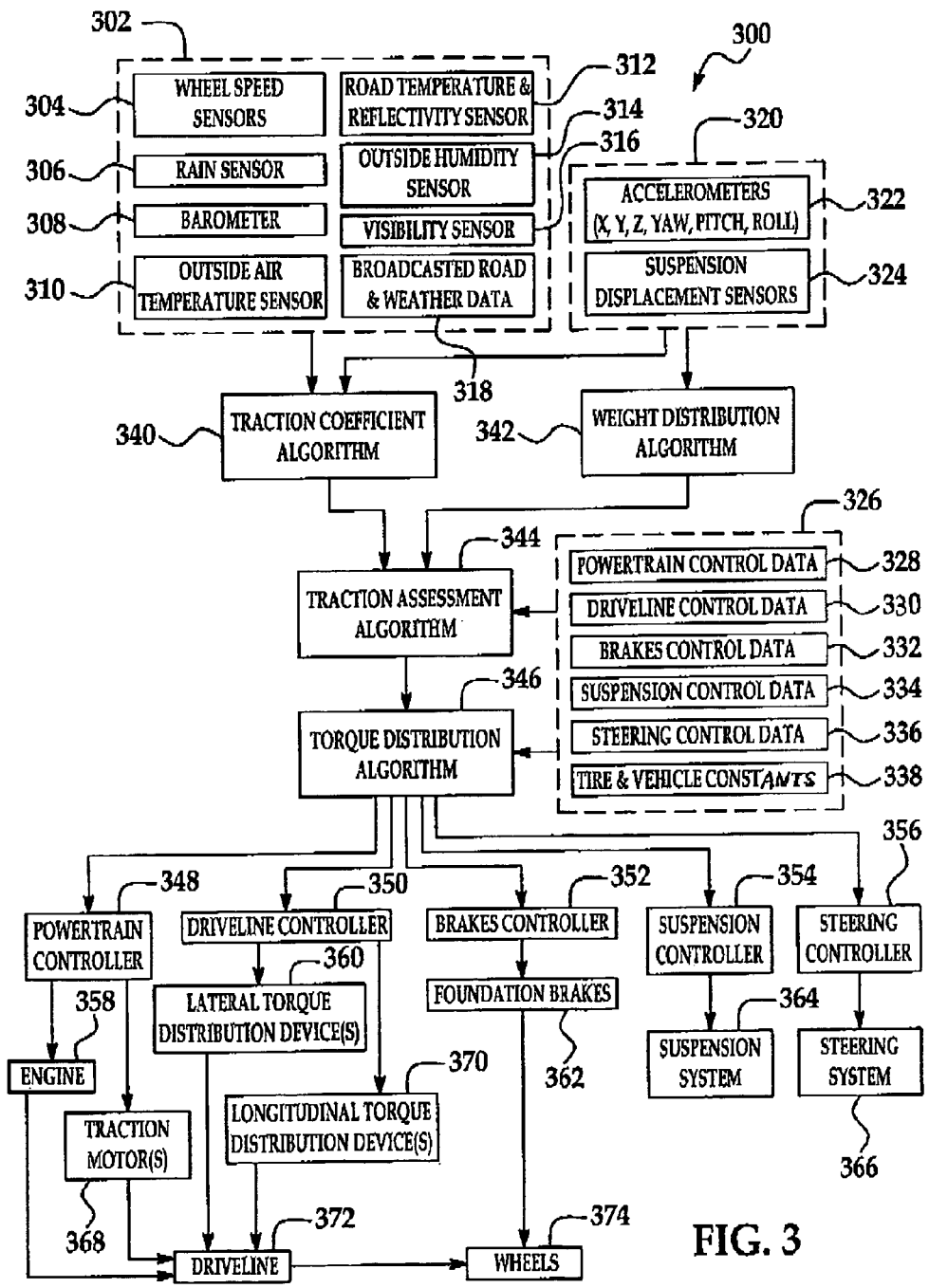
FIG. 3 is a detailed hardware block diagram which illustrates an illustrative embodiment of the regenerative brake control system.

Referring next to FIG. 3, a detailed hardware block diagram 300 which is suitable for implementation of an illustrative embodiment of the regenerative brake control system is shown. The system 300 may include traction condition inputs 302 which can be used to indicate traction of vehicle wheels (not shown) on a surface (not shown), vehicle dynamics inputs 320 which indicate weight distributions of the vehicle among the four wheels of the vehicle during vehicle movement, and/or operational inputs 326 which indicate various control aspects of the vehicle. The traction condition inputs 302 may include, for example and without limitation, wheel speed sensors 304; a rain sensor 306; a barometer 308; an outside air temperature sensor 310; a road temperature and reflectivity sensor 312; an outside humidity sensor 314; a visibility sensor 316; and broadcasted road and weather data 318.

The traction condition inputs 302 are processed by a traction coefficient algorithm 340 which formulates a traction coefficient based on the data provided by the traction condition inputs 302. The traction coefficient which is formulated by the traction coefficient algorithm is transmitted to a traction assessment algorithm 344. The traction assessment algorithm 344 interfaces with a torque distribution manager 346.

The vehicle dynamics inputs 320 may include, for example and without limitation, accelerometers 322 which sense the yaw, pitch and roll movements of the vehicle and suspension displacement sensors 324 which sense displacement of the vehicle suspension during vehicle motion. The vehicle dynamics inputs 320 are processed by a weight distribution algorithm 342. Weight distribution data from the weight distribution algorithm 342 is transmitted to the traction assessment algorithm 344. Traction assessment data from the traction assessment algorithm 344 is transmitted to the torque distribution manager 346.

The operational inputs 326 may include, for example and without limitation, powertrain control data 328; driveline control data 330; brakes control data 332; suspension control data 334; steering control data 336; and tire and vehicle constants 338. The operational inputs 326 are transmitted to the traction assessment algorithm 344 and the torque distribution manager 346.

A powertrain controller 348, a driveline controller 350, a brakes controller 352, a suspension controller 354 and a steering controller 356 interface with the torque distribution manager 346. A vehicle engine 358 and at least one traction motor 368 interface with the powertrain controller 348. A driveline 372 is drivingly engaged by the engine 358 and the traction motor(s) 368. Vehicle wheels 374 are drivingly engaged by the driveline 372. Foundation brakes 362 interface with the brakes controller 352 and are adapted to operably engage the wheels 374.

In some applications, at least one lateral torque distribution device 360 and at least one longitudinal torque distribution device 370 may interface with the driveline controller 350. The driveline 372 interfaces with the lateral torque distribution device(s) 360 and the longitudinal torque distribution device(s) 370.

A suspension system 364 is controlled by the suspension controller 354. A steering system 366 is controlled by the steering controller 356.

The traction assessment algorithm 344 processes the traction coefficient which is received from the traction coefficient algorithm 340, the weight distribution data which is received from the weight distribution algorithm 342, and the operational inputs 326 and uses this data to assess the magnitude of traction at each wheel 374 of the vehicle. Upon braking and deceleration of the vehicle, the torque distribution manager 346 uses this information to operate the powertrain controller 348; the driveline controller 350; the brakes controller 352; the suspension controller 354; and the steering controller 356 in such a manner that, through variable engagement of the driveline 372, regeneration torque is applied in a balanced manner to the wheels 374 in proportion to the traction at each of the wheels 374 while providing desired drive characteristics of the vehicle such as stability, smooth transition between friction braking and regenerative braking, and brake feel, for example and without limitation. In some applications, the lateral torque distribution device(s) 360 and the longitudinal torque distribution device(s) 370 may further optimize or balance distribution of regeneration torque between the wheels 374 of the vehicle.

Figure 6:
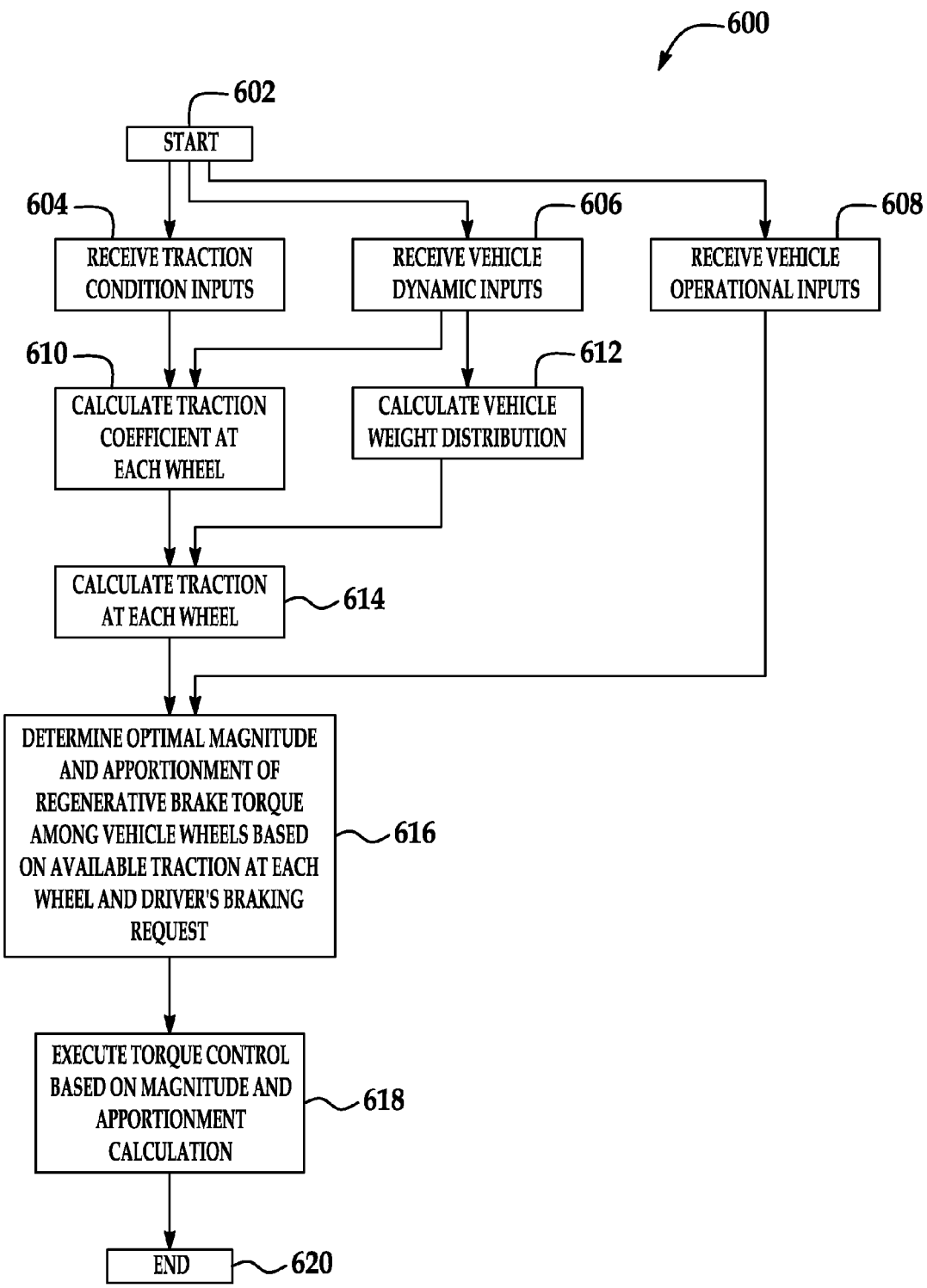
FIG. 6 is a flow diagram which illustrates an illustrative embodiment of the regenerative brake control method.

Referring next to FIG. 6, a flow diagram 600 which illustrates an illustrative embodiment of the regenerative brake control method is shown. The method may begin at block 602. In block 604, traction condition inputs are received. In block 606, vehicle dynamics inputs are received. In block 608, vehicle operational inputs are received. In block 610, the traction coefficient at each wheel is calculated. In block 612, the vehicle weight distribution is calculated. In block 614, the traction available at each wheel is calculated. In block 616, the optimal magnitude and apportionment of regenerative brake torque among vehicle wheels based on available traction at each wheel and the driver's braking request is determined. In block 618, vehicle torque control is executed based on the torque magnitude and apportionment calculation. The method may end at block 620.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A regenerative brake control system for a vehicle, comprising:
   a vehicle controller;
   at least one driveline torque distribution device interfacing with said vehicle controller;
   at least one electric machine interfacing with said driveline torque distribution device;
   a plurality of wheels coupled to said electric machine, said plurality of wheels comprising a front pair of wheels coupled to a front axle and a rear pair of wheels coupled to a rear axle;
   at least one traction condition input indicating traction of each of said plurality of wheels and a respectively associated axle, said traction condition input provided to said vehicle controller; and
   wherein said vehicle controller is configured to engage said at least one driveline torque distribution device and said at least one electric machine is configured to apportion regenerative brake torque to each of said plurality of wheels in respective proportion to said traction of at least one of said axles and each of said plurality of wheels, said regenerative brake torque apportioned to said at least one of said axles further apportioned in respective proportion to said traction of each of said wheels associated with said at least one of said axles.

2. The system of claim 1 wherein said at least one driveline torque distribution device is configured to control torque distribution between said front and rear wheels.

3. The system of claim 2 further comprising at least one lateral torque distribution device configured to control torque distribution between left and right wheels of at least one of said front pair and said rear pair of wheels.

4. The system of claim 1 wherein said at least one traction condition input is configured to indicate at least one of the following:
   wheel speed, rain, barometric pressure, outside air temperature, road temperature and reflectivity, outside humidity, visibility and broadcasted road and weather data.

5. The system of claim 1 further comprising vehicle dynamics inputs configured to indicate vehicle weight distribution provided to said vehicle controller.

6. The system of claim 5 wherein said vehicle dynamics inputs comprise vehicle longitudinal, lateral, vertical, yaw, pitch, and roll motion data.

7. The system of claim 6 wherein said vehicle dynamics inputs further comprises vehicle suspension displacement data.

8. The system of claim 1 further comprising operational inputs configured to be provided to said vehicle controller and comprising at least one of powertrain control data, driveline control data, brakes control data, suspension control data, steering control data and tire and vehicle constants data, and further comprising torque distribution devices interfacing with said electric machine and said plurality of wheels and configured to apportion said regenerative brake torque between said plurality of wheels.

9. A regenerative brake control method for a vehicle, comprising:
provide a vehicle having four wheels, said four wheels comprising a front pair of wheels coupled to a front axle and a rear pair of wheels coupled to a rear axle;
calculating traction availability of each of said wheels and axles, respectively;
determining an optimal regeneration brake torque magnitude and apportionment among each of said wheels based on said traction availability; and
apportioning said optimal regeneration brake torque to each of said wheels in respective proportion to said traction availability at a respective axle, said brake torque further apportioned in respective proportion to traction availability at a respective wheel associated with said respective axle.

10. The method of claim 9 further comprising providing traction condition inputs and wherein said calculating traction availability for said wheels, respectively, comprises calculating traction coefficients for said wheels, respectively, based on said traction condition inputs.

11. The method of claim 10 wherein said providing traction condition inputs comprises providing at least one of wheel speed sensor data, rain sensor data, barometer data, outside air temperature sensor data, road temperature and reflectivity sensor data, outside humidity sensor data, visibility sensor data and broadcasted road and weather data.

12. The method of claim 9 further comprising providing vehicle dynamics inputs comprising vehicle weight distribution and wherein said determining an optimal regeneration brake torque magnitude and apportionment among said wheels based on said traction availability comprises determining an optimal regeneration brake torque magnitude and apportionment among said wheels based on said traction coefficients and said vehicle dynamics inputs.

13. The method of claim 12 wherein said providing vehicle dynamics inputs comprises providing at least one of vehicle longitudinal, lateral, vertical, yaw, pitch and roll motion data and vehicle suspension displacement data.

14. The method of claim 9 further comprising further optimizing regeneration brake torque between said wheels using a combination of at least one longitudinal torque distribution device and at least one lateral torque distribution device.

15. A regenerative brake control method for a vehicle, comprising:
providing a vehicle having four wheels, said four wheels comprising a front pair of wheels coupled to a front axle and a rear pair of wheels coupled to a rear axle;
providing traction condition inputs for each of said wheels;
calculating traction availability of each of said wheels, respectively, based on said traction condition inputs;
providing at least one of vehicle dynamics inputs and operational inputs, said vehicle dynamics input comprising vehicle weight distribution;
determining an optimal regeneration brake torque magnitude and apportionment among each of said wheels based on said traction availability and said at least one of vehicle dynamics inputs and operational inputs; and
apportioning said optimal regeneration brake torque to each of said wheels in respective proportion to said traction availability and said at least one of vehicle dynamics inputs and operational inputs.

16. The method of claim 15 wherein said providing traction condition inputs comprises providing at least one of wheel speed sensor data, rain sensor data, barometer data, outside air temperature sensor data, road temperature and reflectivity sensor data, outside humidity sensor data, visibility sensor data and broadcasted road and weather data.

17. The method of claim 15 wherein said providing vehicle dynamics inputs comprises providing at least one of vehicle longitudinal, lateral, vertical, yaw, pitch and roll motion data and vehicle suspension displacement data.

18. The method of claim 15 wherein said providing operational inputs comprises providing at least one of powertrain control data, driveline control data, brakes control data, suspension control data, steering control data and tire and vehicle constants data.

19. The method of claim 15 further comprising optimizing regeneration brake torque between each of said wheels using a combination of at least one longitudinal torque distribution device and at least one lateral torque distribution device.

20. A regenerative brake control system for a vehicle, comprising:
a vehicle controller;
at least one driveline torque distribution device interfacing with said vehicle controller;
at least one electric machine interfacing with said driveline torque distribution device;
a plurality of wheels coupled to said electric machine, said plurality of wheels comprising a front pair of wheels coupled to a front axle and a rear pair of wheels coupled to a rear axle;
at least one traction condition input indicating traction of each of said plurality of wheels, said traction condition input provided to said vehicle controller; and
wherein said vehicle controller is configured to engage said driveline torque distribution device and said at least one electric machine is configured to apportion regenerative brake torque to each of said plurality of wheels in respective proportion to said traction of each of said plurality of wheels, said system further comprising vehicle dynamics inputs configured to indicate vehicle weight distribution provided to said vehicle controller.

* * * * *